United States Patent [19]

Herr et al.

[11] Patent Number: 5,447,662
[45] Date of Patent: Sep. 5, 1995

[54] OPTICALLY NON-LINEAR POLYMERIC COATINGS

[75] Inventors: Rolf-Peter Herr, Freiburg, Germany; Martin Schadt, Seltisberg, Switzerland; Klaus Schmitt, Lörrach, Germany

[73] Assignee: Hoffmann-La Roche Inc., Nutley, N.J.

[21] Appl. No.: 809,991

[22] Filed: Dec. 18, 1991

[30] Foreign Application Priority Data

Dec. 21, 1990 [CH] Switzerland .................. 4101/90

[51] Int. Cl.$^6$ .................. F21V 9/00; C09K 19/52; G03C 1/00
[52] U.S. Cl. .................. 252/582; 252/299.01; 430/495; 430/945
[58] Field of Search .................. 430/495, 945; 252/582, 252/299.01; 359/328, 329

[56] References Cited

U.S. PATENT DOCUMENTS

| | | | |
|---|---|---|---|
| 4,696,990 | 9/1987 | Noonan et al. | 252/299.01 |
| 5,078,910 | 1/1992 | Litt | 252/299.01 |
| 5,138,010 | 8/1992 | Keller et al. | 252/299.01 |
| 5,173,546 | 12/1992 | Kester et al. | 252/299.01 |
| 5,210,630 | 5/1993 | Heyndericky et al. | 252/299.01 |
| 5,224,196 | 6/1993 | Khanarian et al. | 252/582 |
| 5,227,090 | 7/1993 | Scherowsky et al. | 252/299.01 |
| 5,234,557 | 8/1993 | Yoon et al. | 252/582 |

FOREIGN PATENT DOCUMENTS 0358476 3/1990 European Pat. Off.

OTHER PUBLICATIONS

Ulrich, Mol. Cryst. Liq. Cryst., vol. 189, pp. 3–38 (Oct. 1990).
Singer, et al. Appl. Phys. Lett. 49:No. 5 248–250 (1986).
Eich, et al. J. Appl. Phys. 66:No. 7, 1 3241–3247 (1989).

*Primary Examiner*—Philip Tucker
*Attorney, Agent, or Firm*—George M. Gould; George W. Johnston; John P. Parise

[57] ABSTRACT

Polymeric coatings having optically non-linear or optically anisotropic properties in selected areas and of any arbitrary shape including a pattern. These zones are sharply defined from surfaces having centro-symmetrical or isotropic configurations or from surfaces with different optically non-linear or anisotropic properties. The polymeric coating has optically non-linear and/or mesogenic side chains, selected surface areas of which are cross-linked by the action of light, the zones which have optically non-linear or anisotropic properties being subjected to the influence or orienting fields or forces during the cross-linking process. The distances between optically different zones are limited to typically about 1 μm.

13 Claims, 4 Drawing Sheets

OPTICALLY NON-LINEAR POLYMERIC COATINGS

SUMMARY OF THE INVENTION

The invention relates to polymeric coatings having optically non-linear or anisotropic properties in selected surface areas of arbitrary shape, such areas being defined relative to surfaces having centro-symmetrical or isotropic configurations or to surfaces having different optically non-linear or anisotropic properties. The invention also relates to processes for the production of such coatings, and their use as optical components.

BACKGROUND OF THE INVENTION

It is known that organic and polymeric materials with large delocalised $\pi$-electron systems may have optically non-linear coefficients which are larger than those of inorganic materials.

The properties of organic and polymeric materials also can be readily varied so that valuable secondary properties, such as mechanical and chemical stability, optical absorption, etc., can be set without negatively affecting non-linearity.

Thin films of organic or polymeric materials having considerable non-linearity of the second order have a great potential for use in the areas of optical communication, laser technology, electro-optics, and related fields.

It is particularly significant that the non-linearity of these materials is due to the ability of the $\pi$-electron system to be polarizable and not due to a shift or a reorientation of atoms or molecules. Components having ultra-short response times, therefore, can be realised with these materials.

This field has been the subject of intensive research for many years and is documented, for example, in the following publications:

ACS Symposium Series 233, Washington D.C. 1983;
Proceedings of SPIE Vol. 682 1986 Molecular and Polymeric Optoelectronic Materials: Fundamentals and Applications;
Proceedings of SPIE Vol. 824 1987 Advances in Nonlinear Polymers and Inorganic Crystals, Liquid Crystals, and Laser Media;
Proceedings of SPIE Vol. 1105 1989 Materials for Optical Switches, Isolators, and Limiters;
Proceedings of SPIE Vol. 1147 1989 Nonlinear Optical Properties of Organic Materials 2;
NATO ASI Series E: Applied Sciences Vol. 162 1989 Nonlinear Optical Effects in Organic Polymers;
Springer Proceedings in Physics 36 1989 Nonlinear Optics or Organics and Semiconductors.

Particularly important for these applications are side-chain polymers and liquid-crystalline side-chain polymers which are doped with non-linear optical (nlo) chromophores or having nlo groups as side chains. For the purpose of this description, the term side-chain polymers also includes co-polymers and homopolymers. It is known that suitably selected representatives of this kind of materials can be given a dipolar orientation by heating above its glass temperature in a high electric field and retaining this non-centro-symmetrical order by cooling below the glass temperature Tg under the applied electric field. Frozen poled glasses of this kind represent nlo materials with high $\chi^{(2)}$ susceptibility (K.D. Singer et al. ,Appl. Phys. Let. 49, 1986).

A basic obstacle to the technical use of these materials is the inadequate long-term stability of the dipolar order. It has been found that relaxation occurs even below the glass temperature of the polymer system and destroys the previously imposed non-centro-symmetrical structure.

There are various strategies for increasing the stability of the dipolar order by modification of the polymer. Since the relaxation processes slow down with increasing distance from the glass temperature, one method is to select polymers having the highest possible glass temperature. Another method is to use cross-linked or branched polymer networks instead of linear polymers.

Much better long-term and temperature-stable nlo-active polymers have been obtained by using nlo chromophores with several (2–4) reactive substituents to act as crosslinking units in an epoxide system (M. Eich J. Appl. Phys. 66, 3241, 1989). In these epoxides, the cross-linking reaction takes place under the influence of an electric field and results in a partially dipolar-oriented network. This orientation is retained after the field has been switched off, because the dipolar order is chemically fixed.

The simple and precise patterning of nlo-active polymer networks is of fundamental importance for its technical use. Since, in the prior art processes, the cross-linking was initiated thermally, it encompasses the entire coating and cannot be restricted to selected partial areas.

Thus the generation of a geometrical pattern is only possible by the use of structured poling electrodes. However, this is accompanied by a number of serious disadvantages. Unavoidable electric stray fields at the edges of the electrodes cause the boundaries of the poled zones to become blurred. This is unacceptable for many applications, for example, strip waveguides, periodic structures of poled and unpoled regions etc.. Also, for most applications the electrode coatings have to be tediously removed again in later additional steps.

DETAILED DESCRIPTION OF THE INVENTION

The object of the invention is to eliminate these disadvantages. More particularly, it is an object of the invention to produce stable $\chi^{(2)}$-active polymer coatings which may have complex geometric structures. Another object of the invention is the production of stable liquid-crystalline polymeric coatings with complex geometric structures consisting of areas of different anisotropy, possibly combined with isotropic areas.

To this end, according to the invention, the polymeric film referred to above has optically non-linear side chains, mesogenic side chains, or both, selected surface areas of which are cross-linked by the action of light, whereby the areas having optically non-linear or anisotropic properties are subjected to the influence of an electric dc field during crosslinking.

Another embodiment of the invention is polymeric coating comprising at least one polymer with optically non-linear side chains, mesogenic side chains or combinations thereof, the side chains capable of being cross-linked by irradiation and capable of being oriented during cross-linking, said coating having at least two adjacent zones, the first zone having optically non-linear or anisotropic properties, the second zone having centro-symmetrical, isotropic or differently optically non-linear or anisotropic properties.

One type of polymeric coating according to this invention can be characterized in that the photo-initiated cross-linking of the side chains proceeds by radical polymerization of methacrylates or acrylates.

Another type of polymeric coating according to this invention can be characterized in that the photo-initiated cross-linking of the side chains proceeds by a 2+2-cyclo addition of cinnamic acid derivatives.

According to another aspect of the invention, the polymeric coating is characterized in that the transition between the optically different areas is limited to less than 10 gm, preferably to less than 1 μm.

The production of such coatings according to the invention is characterized by the following steps: Application of a coating of a polymeric material having photo-cross-linkable side chains to a support, application of an electric field, selective irradiation of the layer areas for selective cross-linking using light of a suitable wavelength which causes cross-linking.

Another embodiment of the invention is process for the production of a polymeric coating comprising at least one polymer with optically non-linear side chains, mesogenic side chains or combinations thereof, the side chains capable of being cross-linked by irradiation and capable of being oriented during cross-linking, said coating having at least two adjacent zones, the first zone having optically non-linear or anisotropic properties, the second zone having centro-symmetrical, isotropic or differently optically non-linear or anistropic properties, the process comprising in sequence:

a) applying at least one polymer to a support;

b) subjecting the at least one polymer to an orientation force selected from the group consisting of an electric field, magnetic field, wall-orientation forces or shearing forces to produce an oriented polymer;

c) masking at least a preselected portion of the at least one polymer with a mask; and d) irradiating the oriented polymer through the mask with light capable of cross-linking the side chains to produce the polymeric coating.

The process according to the invention produces nlo films, which are stable thermally as well as with respect to time by photo-initiated cross-linking of suitable co-polymers under the influence of a steady high electric dc field.

Under these conditions poling and cross-linking are independent. Poling takes place where the electric field is applied, cross-linking takes place where irradiation is applied. The poled non-cross-linked (=non-irradiated) areas lose the dipolar orientation after the electric field is switched off, while the cross-linked (=irradiated) poled areas retain it. Cross-linked and non-polar areas remain $\chi^{(2)}$-inactive even when the electric field becomes operative again.

Cross-linked poled areas retain their dipolar orientation even when an electric field is applied in the opposite direction.

These films can also be selectively $\chi^{(2)}$-activated by photo-lithography.

This property of the film enables complex optical components to be produced in a simple manner, for example strip waveguides, frequency-doubler waveguides (quasi-phase matching), optical correlators, two-beam interferometers, modulators, electro-optical switches.

The preparation temperature, in principle, can be freely selected since the photo-initiation is temperature-independent (in contrast to thermal initiation). This allows to choose the optimum temperature with respect to temperature sensitive properties of the material like ion conductivity, viscosity, order parameter, chromophore stability etc.

The fixed nlo-active areas are defined by the irradiation pattern. Electrodes which determine the structure are not required.

Different areas of a film can be cross-linked successively. This allows great freedom with respect to the construction of complex components.

Cross-linked and non-cross-linked areas can be produced selectively; the non-cross-linked areas can be removed by solvents and replaced by other materials without disturbing the cross-linked area (strip waveguides, cladding).

By adding small quantities of inhibitor molecules it is possible to produce sharp boundaries between cross-linked and non-cross-linked areas. Initiator radicals which diffuse into the non-irradiated areas are deactivated by the inhibitor.

The potential use of these polymeric coatings and methods for producing them can be expanded by the use of liquid-crystalline side-chain polymers with photo-cross-linkable side chains.

Above their clearing temperature, $T_c$, these polymers have the same properties as the amorphous polymers already described. In addition, however, they are anisotropic below $T_c$, for example, in the nematic phase. It is known that liquid-crystalline polymers can be axially oriented to a high degree in the nematic phase (for example, by electric fields). This orientation can be selectively fixed by lithography as described. By increasing the temperature above $T_c$ the non-cross-linked part of the coating is converted into the isotropic state and can there be treated like the described amorphous polymers, the zone which was already cross-linked in the first step remaining anisotropic.

Materials which can be modulated both, in their linear and nonlinear optical properties have a high potential for use in integrated optics.

Moreover, it is possible optically to write into the nlo-material the coupling and decoupling grating for an nlo waveguide.

In addition to the amorphous and liquid-crystalline copolymers described above which have nlo-active and inactive side chains, the same structural and processing principle can also be applied to homopolymers, oligomers and monomers having a plurality of cross-linkable branches.

The object of the non nlo-active co-monomers is to add additional design flexibility to the nlo-material, such as to influence, e.g. the optical density, refractive index, hardness, brittleness, shrinkage on cross-linking, glass temperature and viscosity.

BRIEF DESCRIPTION OF THE DRAWINGS

Exemplified embodiments of the invention will be described below with reference to the accompanying drawings wherein:

FIG. 1 shows the principle of cross-linking of a polymeric material having a dipolar orientation over a specifically structured area. The material is provided in the form of a polymeric coating 1 between a bottom glass plate 2, the top surface of which has an indium tin oxide (ITO) coating 4, and a glass plate 3 disposed parallel to the plate 2 at a distance of about 1–10 μm, the underside of the glass plate 3 also having an ITO coating 5. The arrangement consisting of ITO-coated glass plates is hereinafter referred to as the cell.

Figure 1:
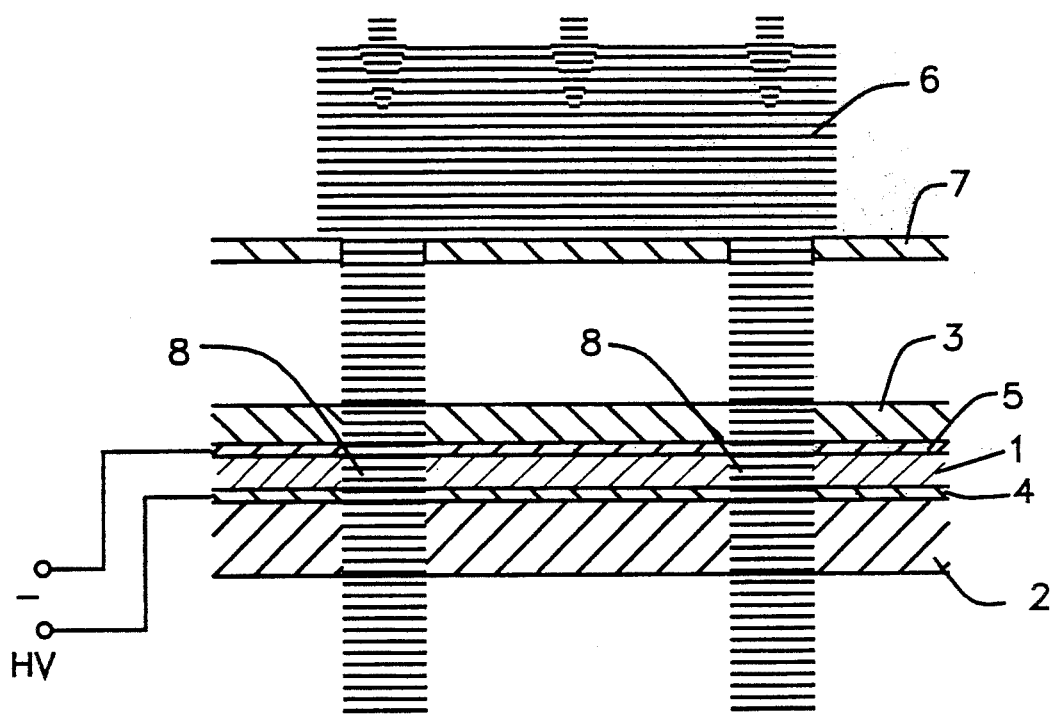
FIG. 1 is an illustration of the principle of cross-linking selected surface areas.

The ITO coatings are connected to the high-voltage supply HV. When the DC voltage is applied, a dipolar orientation is induced in the polymeric material which is not yet cross-linked.

The cell is exposed to a parallel beam of light 6 in the ultraviolet range, a mask 7 limiting the beam to the surface areas 8 which are to be cross-linked. When the high-voltage is switched off after cross-linking, the dipolar orientation is retained only in the cross-linked zones. The material that is not cross-linked in the other zones can easily be removed by a suitable solvent.

Alternatively, after removal of mask 7 the material can also be cross-linked without an applied voltage which leads to a fixed centro-symmetrical structure in the areas defined by mask 7.

If the polymeric material 1 is liquid-crystalline, it is axially oriented by known methods in the electric field by the application of a voltage across the electrodes 4 and 5. Depending on the voltage and dielectric anisotropy of the material, it is possible, for example, to produce a homeotropic structure in the liquid-crystalline polymeric material and to cross-link it in selective surface areas by means of mask 7. The polymeric coating then, for example, can be removed in those areas which have not been cross-linked. Alternatively, cross-linking of the remaining zones can be effected with a different structure, for example, a planar structure can be induced.

Figure 2:
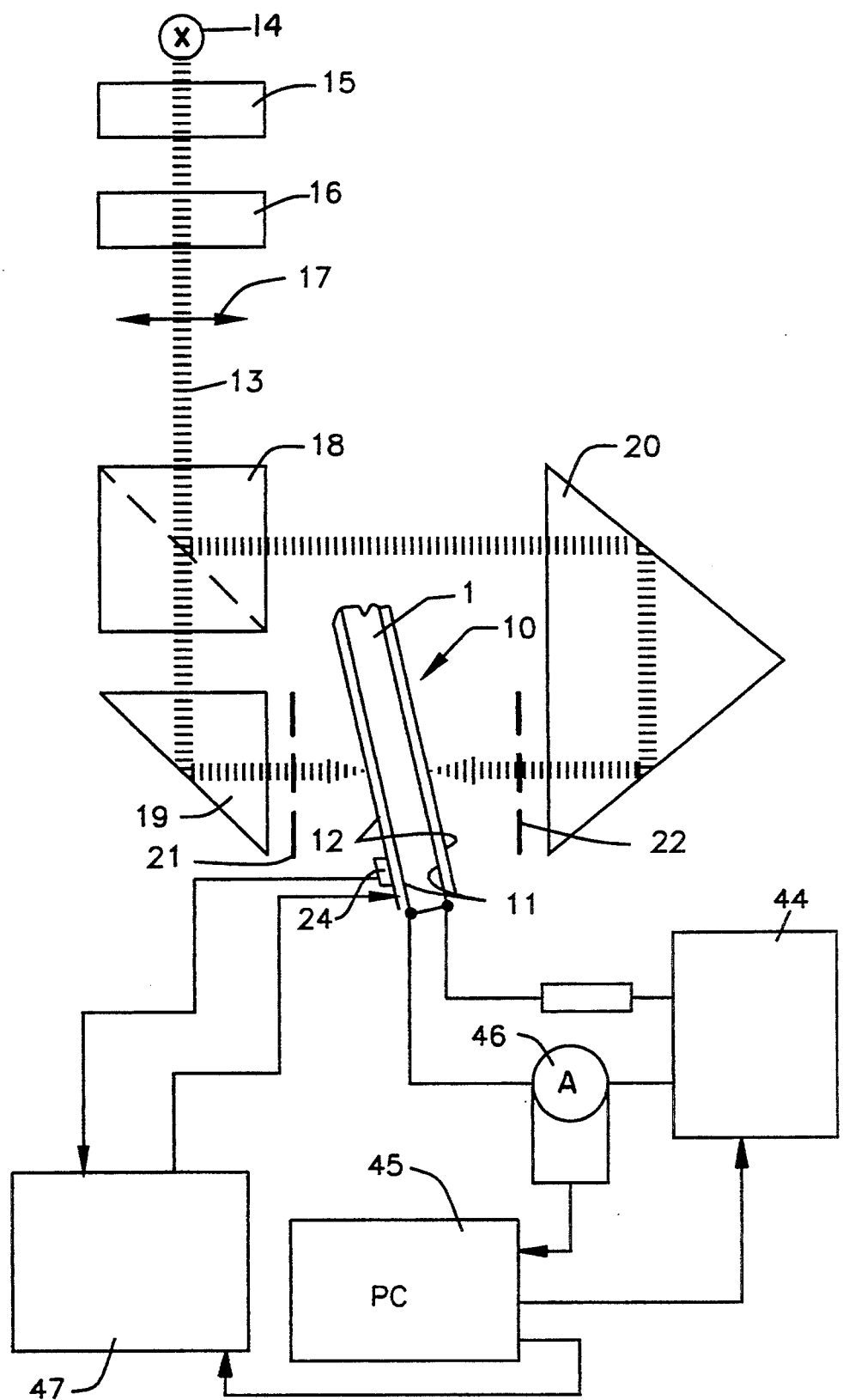
FIG. 2 is a diagram showing the apparatus for producing an optically non-linear coating between electrode-coated glass plates.

The principle shown in FIG. 1 can be performed with the apparatus shown in FIG. 2.

The material 1 intended for the production of an optically nonlinear polymeric coating having structured surface areas is located in a cell 10 similar to that shown in FIG. 1. The cell consists of electrode-coated glass plates 11 additionally provided with an outer heating coating 12.

The cell 10 is located in an optical system which enables it to be irradiated with UV-light 13 from two sides. The light passes from an ultra-violet lamp 14 via a thermal protection filter 15, a UG1 filter 16 and a lens or optical system 17 to a beam splitter 18. The latter splits the beam 13 into two equal sub-beams to irradiate the cell with the same intensity from both sides.

The transmitted beam passes to a prism 19 and is reflected through a mask 21 on to the cell 10. The beam deflected by the beam splitter 18 passes to a prism 20 from which it passes by double reflection through a mask 22 on to the opposite side of cell 10.

The electrode plates 11 are connected to a high-voltage generator 44 controlled by a computer 45. The very low current through the cell is measured by a picoammeter 46. The amount of current recorded is the control parameter for adjusting the high voltage. The voltage applied to the polymeric coating is selected such that the resulting current does not exceed a preselected value.

The heating coatings 12 of the cell are connnected to a temperature monitoring device 47. A temperature sensor 24 which determines the actual temperature is provided on the cell. The set-value for the temperature control is also determined by the computer 45.

The procedure for making an optically non-linear coating is as follows.

A polymeric material having photo-cross-linkable side chains, some of which have nlo-groups, is mixed with a small quantity (typically 5% concentration) of photo-initiator (for example, by dissolving it in a common solvent followed by evaporation of the solvent). The dried material is heated above the glass temperature Tg, and then pressed between glass plates coated with transparent electrodes, the coating thickness being defined by spacers. Alternatively, the material can be sucked into prefabricated cells.

The temperature of the coating is reduced so that a high electric field (1MV/cm) can be applied between the electrodes without high ion currents destroying the sample. The poling field induces a dipolar orientation of the nlo-groups which possess permanent dipole moments, this eliminates the centro-symmetry of the original isotropic material.

At the same time, the coating is irradiated with light of a suitable wavelength to initiate the cross-linking reaction. Under the influence of the electric field the cross-linking results in a non-centro-symmetrical network. This is directly observable by measuring the second harmonic signal.

The cross-linking reaction results in a continuous increase of the glass temperature and hence of the electric resistance, so that a higher voltage becomes permissible during polymerization. The maximum voltage used depends on the breakdown strength of the polymeric material and is pre-selectable. As soon as this maximum voltage has been reached, the cell temperature is increased, thus following the rising glass temperature of the polymer. As a result of the continuous increase of the reaction temperature the polymeric material remains sufficiently mobile so that the cross-linking reaction can be pushed to a high degree of cross-linking.

After a sufficiently high temperature has been reached, cross-linking has advanced to such an extent that a stable non-centro-symmetrical network has formed and is retained when the electric field is switched off.

Figure 3:
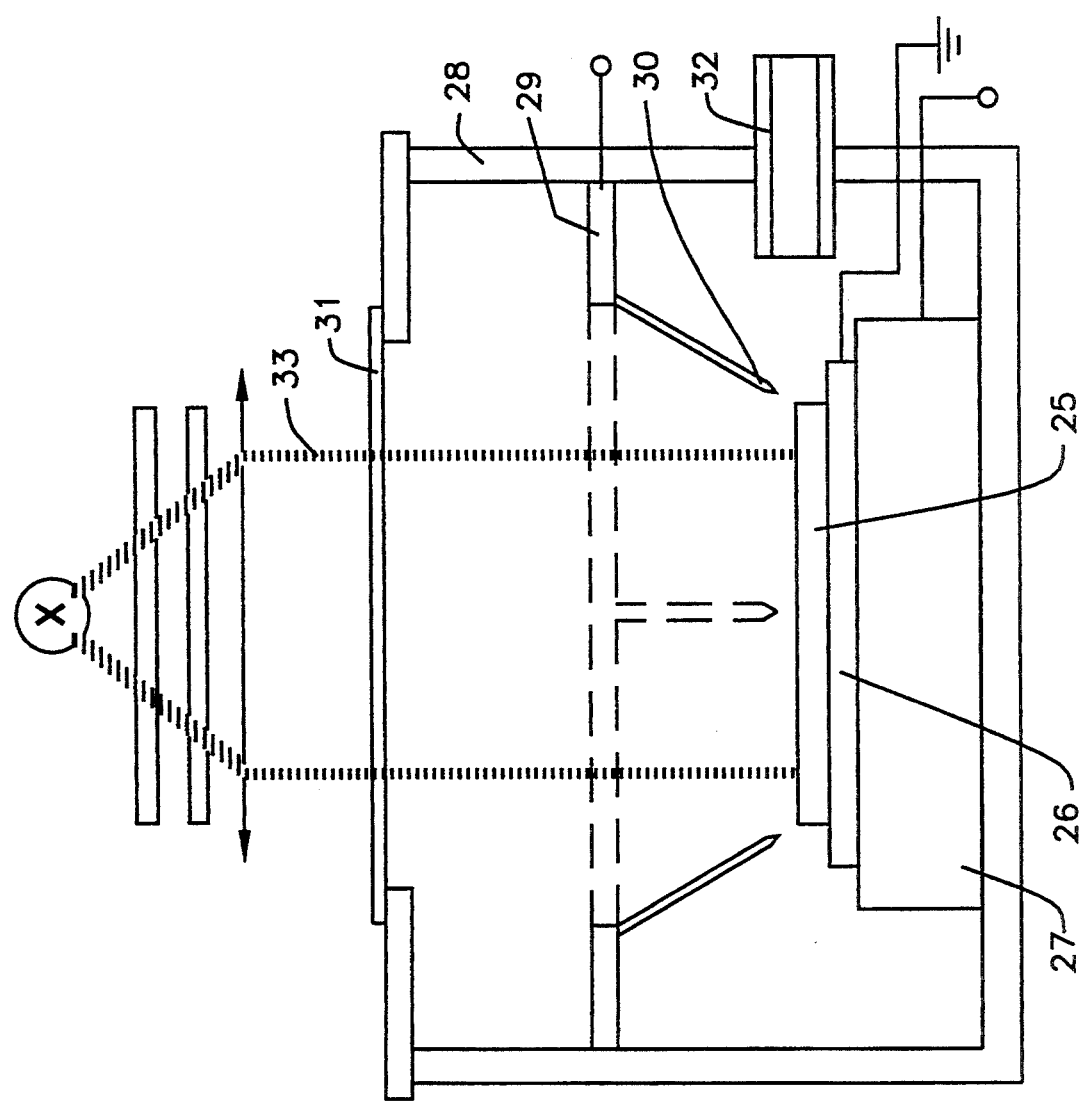
FIG. 3 is a diagram showing the apparatus for the production of an optically non-linear coating on a substrate coated with a conducting layer.

An optically non-linear coating 25 is produced on a substrate 26 having an electrode coating by means of the apparatus shown in FIG. 3:

Polymeric material having photo-cross-linkable side chains, some of which have nlo-groups with a permanent dipole moment, is dissolved with a small quantity of photo-initiator in a suitable solvent. The solution concentration is adjusted so that its viscosity is suitable for spin coating. The solution is centrifuged in a spin coating apparatus on a support 26 coated with an electrode, so as to form a homogeneous coating having a thickness of 0.5 to 5 μm. The film is then dried on a heat bench and preferably tempered to reduce the free volume.

In the corona poling apparatus shown in FIG. 3, the polymeric coating is poled in an inert gas atmosphere on a cooling/heating plate 27. The corona poling apparatus is known per se. It comprises a housing 28, the inside of which contains a heating table 27 on which the substrate 26 with the polymeric coating 25 is placed. A high-voltage device 29 is disposed above the heating table and has downwardly projecting points 30 which generate a large electric field in the region of the polymeric coating 25.

The housing is covered by a window 31 and has an inlet 32 for inert gas. The apparatus is flooded with an inert gas (N₂, Ar) in order to exclude oxygen which inhibits radical cross-linking. The coating is irradiated through the window with uv light 33 of suitable wavelength to initiate cross-linking. In the area of the corona discharge, the chromophores have a dipolar orientation so that a permanent non-centro-symmetrical network forms. During the reaction, the sample temperature follows the rising glass temperature Tg of the coating.

By means of a downscaling projection it is possible to transfer fine structures onto the polymeric coating. The exposed and unexposed areas are sharply separated from one another. By the addition of small amounts of inhibitor it is possible to prevent the diffusion of the photo-initiator from initiating cross-linking in non exposed zones.

In addition to the use of photo masks it is possible to use holographic processes for generating pattern.

As already partly stated, combinations of differently treated areas are possible in the polymeric coating according to the invention. Cross-linked poled areas and non-cross-linked poled areas can be combined to produce strip waveguides. In the cross-linked zone, the material is insoluble and in the non-cross-linked areas it is soluble. The non-cross-linked material can be removed by means of a solvent. The free areas can be covered with other polymeric material in the next operation (buffer coatings, cladding).

Alternatively it is possible to combine cross-linked poled and cross-linked non-poled areas, for example, for the production of frequency-doubler waveguides. In the first operation, strips of a width of the coherence length separated from non-cross-linked strips of the same width are cross-linked in the electric field by means of a grating mask in the path of the rays. After the electric field has been switched off, the non-cross-linked strips relax into the isotropic (non $\chi^{(2)}$-active) state.

In the second operation the screen is removed so that the entire sample is cross-linked. A film forms which consists periodically of $\chi^{(2)}$-active and inactive areas, whose width is precisely the coherence length. The refractive index of the poled and unpoled zones is practically identical. Light propagating this waveguide experiences only slight reflection at the interface coating. This results in efficient frequency-doubler waveguides by realisation of the quasi-phase-matching condition.

Another combination consists of cross-linked poled zones and cross-linked zones of opposite polarity. This combination is similar to that described above, but in the second operation the sample is oriented in a field of opposite polarity. Under these conditions, the strips which are cross-linked in the first operation remain unaffected. Periodic strip pattern result with a dipolar orientation of opposite directions. All the strips are $\chi^{(2)}$-active. The strip width (=coherence length) is selected such that the gnerated second harmonic is amplified with phase matching over the entire sample length (quasi phase-matching). The refractive index of neighboring strips is identical.

Figure 4:
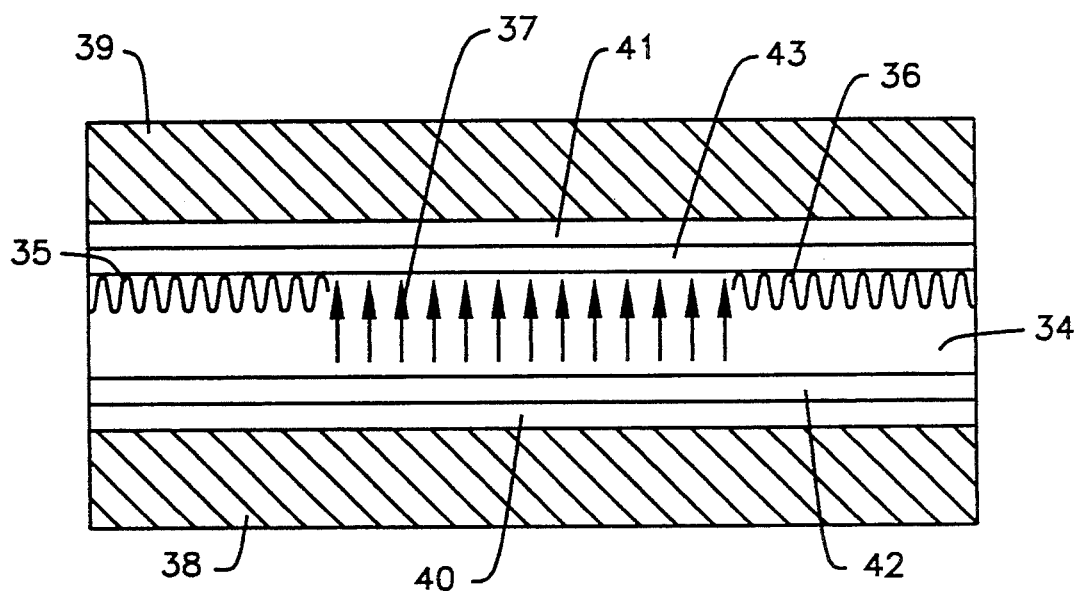
FIG. 4 is a diagram illustrating a waveguide element.

The waveguide element shown in FIG. 4 uses the anisotropic and the nlo properties of a liquid-crystalline nlo polymeric coating 34. The waveguide element consists of a pair of parallel spaced glass plates 38, 39 coated with ITO electrodes 40 and 41. In addition, they have buffer coatings 42 and 43. The liquid-crystalline polymeric coating 34 is contained between them. The buffer coatings have a refractive index below that of the polymer. Light is coupled into the waveguide via a grating 35 and 36 which is optically written into the polymer in accordance with the process described below. In the middle part 37 of the element, the coupled light traverses a $\chi^{(2)}$-active area which is produced by poling and cross-linking and in which the $\chi^{(2)}$-process, (for example, (SHG) or Pockel's effect) takes place.

The following process steps are carried out in production of the polymeric coating. The liquid-crystalline material in the mesophase with $\Delta\epsilon > 0$ is given homeotropic orientation in the electric alternating field. In the zones 35 and 36 the photo-cross-linkable material is irradiated with ultraviolet light to form a Strip pattern of suitable periodicity (e.g. by two-beam interference).

Cross-linking takes place in the region of the exposed strips.

The polymeric coating is then heated to a temperature $T > T_c$, so that it becomes isotropic except for the already cross-linked homeotropic strips. The zones 35 and 36 are irradiated uniformly with ultraviolet light through a mask so that the cross-linking which takes place in the entire area 35 and 36 fixes the isotropic condition here. As a result strips which exhibit homeotropic orientation are obtained in an isotropic matrix.

Area 37 which is still non-cross-linked is now exposed to a high electric dc field. As a result the side chains of the polymer in the area 37 received a dipolar orientation so that the coating becomes $\chi^{(2)}$-active in this part. Simultaneously the sample is irradiated with ultra-violet light, so that cross-linking occurs in area 37 thus fixing the dipolar orientation.

Suitable irradiation sources are lamps which emit in the wavelength range of absorption of the photo-initiator. Care must be taken to ensure that the spectral range of the chromophore absorption is not excited. Since conventional initiators are sensitive in the range between 200 and 400 nm, cold-light sources are suitable, for example, Hg, D₂, Xe lamps, halogen lamps, lamp and filter combinations, and also laser systems such as dye lasers, excimer lasers, N₂ lasers, and Nd:YAG 3rd harmonic.

Pulsed excitation is particularly advantageous. Since crosslinking continues after excitation has been stopped excess photo exposure of the sample can be drastically reduced. Suitable light sources are flashlamps Xe, D₂, pulsed lasers N₂, excimer lasers and Nd:YAG 3rd harmonic.

A number of known polymers with photo-cross-linkable side chains are suitable for the production of the coatings according to the invention. For example, the following typical substances are advantageously used.

An amorphous nlo-polymer having photo-cross-linkable side chains has the following structural formula:

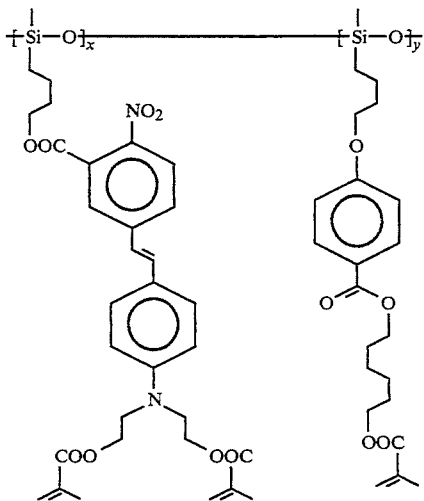

wherein x and y are integers which total at least 20, and the x monomer comprises between about 10–80 mole percent of the total x+y monomer units.

A liquid-crystalline polymer with photo-cross-linkable side chains with the following structural formula:

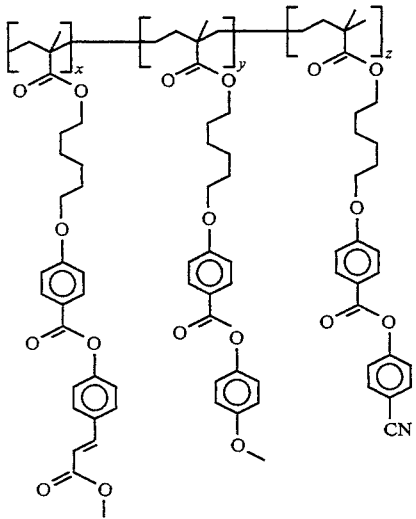

wherein x, y and z are integers which total at least 20, and the x monomer comprises between about 10–80 mole percent of the total x+y+z monomer units.

Conventional commercial initiators are, for example, phenone derivatives Darocur, Irgacure, isopropylthioxantones/H donor combination (N-methyl diethanolamines). The absorption of the initiator must lie outside the chromophore absorption. When selecting the initiator care must be taken to ensure that the nlo chromophore does not act as a triplet quencher of the excited initiator and hence prevent the formation of radicals.

We claim:

1. A polymeric coating comprising a polymeric material with non-linear optical or mesogenic side-chains, the polymeric coating exhibiting non-linear optical or anisotropic properties in selected areas of predetermined shape, the selected areas being defined with respect to other areas having different linear or non-linear optical properties, the selected areas having been cross-linked by the action of light irradiated through a mask which allows the light to selectively irradiate the selected areas, where during cross-linking the areas having non-linear optical or anisotropic properties have been subjected to the orienting influence of a force selected from a group consisting of electric fields, magnetic fields, wall-orientation forces and shearing forces.

2. The polymeric coating according to claim 1, wherein the transition between the areas of predetermined shape and the other areas having different linear or non-linear optical properties is limited to less than 10 μm.

3. The polymeric coating according to claim 1 or 2, wherein the areas of predetermined shape and the other areas of different linear or non-linear optical properties form a pattern.

4. The polymeric coating according to claim 1 or 2, wherein the areas of predetermined shape and the other areas of different linear or non-linear optical properties consist of a cross-linked polymer.

5. The polymeric coating according to claim 1, wherein at least one of areas of predetermined shape and the other areas of different linear or non-linear optical properties include a cross-linked polymer.

6. The polymeric coating according to claim 1, wherein an area of predetermined shape or an other area of different linear or non-linear optical properties exhibits centro-symmetrical properties and is not cross-linked.

7. The polymeric coating according to claim 1, wherein the polymeric material is a liquid crystalline size-chain polymer.

8. The polymeric coating according to claim 1, wherein the side-chains are photo initiated cross-linked by radical polymerization of methacrylates or acrylates.

9. The polymeric coating according to claim 1, wherein the side-chains are photo initiated cross-linked by a 2+2-cyclo-addition of cinnamic acid derivatives.

10. A polymeric coating exhibiting non-linear optical or anisotropic properties in selected areas of predetermined shape, which comprises a polymer having the following structural formulas:

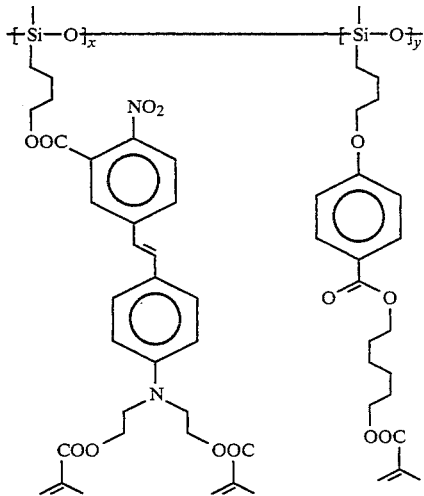

wherein X and Y are integers which total at least 20, and the X monomer comprises between about 10–80 mole percent of the total X+Y monomer units.

11. A polymeric coating exhibiting non-linear optical or anisotropic properties in selected areas of predetermined shape, which comprises a polymer having the following structural formula:

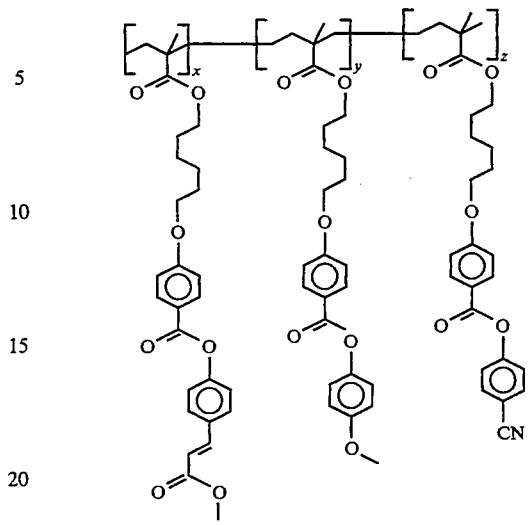

wherein X, Y and Z are integers which total at least 20, and the X monomer comprises between about 10–80 mole percent of the total X+Y+Z monomer units.

12. The polymeric coating of claim 2, wherein the transition between the areas of predetermined shape and the other areas having different linear or non-linear optical properties is limited to less than 1 μm.

13. The polymeric coating of claim 1, wherein the polymeric material has both non-linear and mesogenic side-chains.

* * * * *